(12) United States Patent
Pero et al.

(10) Patent No.: US 8,418,436 B2
(45) Date of Patent: Apr. 16, 2013

(54) VARIABLE AREA FAN NOZZLE AND THRUST REVERSER

(75) Inventors: Edward B. Pero, Somers, CT (US); Leonard D. Aceto, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/238,028

(22) Filed: Sep. 21, 2011

(65) Prior Publication Data

US 2012/0005999 A1 Jan. 12, 2012

Related U.S. Application Data

(63) Continuation of application No. 11/693,096, filed on Mar. 29, 2007, now Pat. No. 8,127,529.

(51) Int. Cl.
*F02K 3/02* (2006.01)

(52) U.S. Cl.
USPC ............................................. 60/226.2; 60/230

(58) Field of Classification Search ................ 60/226.1, 60/226.2, 228–230, 770, 771; 239/265.13, 239/265.19, 265.31, 265.33, 265.37; 244/110 B
See application file for complete search history.

(56) References Cited

U.S. PATENT DOCUMENTS

| | | | |
|---|---|---|---|
| 3,601,992 A | 8/1971 | Maison | |
| 3,779,010 A | 12/1973 | Chamay et al. | |
| 4,030,291 A | 6/1977 | Sargisson | |
| 4,514,137 A * | 4/1985 | Elliott | ................................ 415/1 |
| 4,922,712 A | 5/1990 | Matta et al. | |
| 5,054,285 A * | 10/1991 | Geidel et al. | ................. 60/226.2 |
| 5,255,510 A | 10/1993 | Lardellier | |
| 5,267,438 A | 12/1993 | Bunel et al. | |
| 5,309,711 A | 5/1994 | Matthias | |
| 5,775,097 A | 7/1998 | Lardy et al. | |
| 5,778,659 A | 7/1998 | Duesler | |
| 5,852,928 A | 12/1998 | Vauchel | |

(Continued)

FOREIGN PATENT DOCUMENTS

| | | |
|---|---|---|
| CA | 2223564 | 6/1998 |
| DE | 3844188 | 5/1990 |

(Continued)

OTHER PUBLICATIONS

European Search Report for European Patent Application No. 08250849.0-2321 completed on Oct. 23, 2012.

*Primary Examiner* — Phutthiwat Wongwian
(74) *Attorney, Agent, or Firm* — Carlson, Gaskey & Olds

(57) ABSTRACT

A nozzle for use in a gas turbine engine includes a nozzle door having a first end, a second end opposed from the first end, and a first pivot on the door between the first and second ends. A linkage connects to the nozzle door and to an actuator. The actuator is selectively operative to move the linkage about a second pivot to in turn move the nozzle door about the first pivot between a plurality of positions, such as stowed, intermediate, and thrust reverse positions to influence bypass airflow through a fan bypass passage. The fan bypass passage has a radially outward side defined by a nacelle in at least one position. At least a portion of the nozzle door is radially outward of the nacelle and includes a lip extending from the nozzle door between the first pivot and one of the first end and second end.

10 Claims, 3 Drawing Sheets

U.S. PATENT DOCUMENTS

| | | | |
|---|---|---|---|
| 5,974,783 A | 11/1999 | Gonidec et al. | |
| 5,996,937 A | 12/1999 | Gonidec et al. | |
| 6,079,201 A | 6/2000 | Jean | |
| 6,895,742 B2 | 5/2005 | Lair et al. | |
| 6,976,352 B2 | 12/2005 | Lair | |
| 7,028,461 B2 * | 4/2006 | Goi | 60/39.22 |
| 7,721,549 B2 * | 5/2010 | Baran | 60/226.1 |
| 2002/0069637 A1 * | 6/2002 | Becquerelle et al. | 60/226.1 |
| 2002/0125340 A1 * | 9/2002 | Birch et al. | 239/265.11 |
| 2003/0218094 A1 | 11/2003 | Lair | |
| 2004/0068978 A1 | 4/2004 | Lair et al. | |
| 2007/0007769 A1 * | 1/2007 | Basteck | 290/1 C |
| 2008/0060341 A1 * | 3/2008 | Loisy | 60/226.1 |
| 2009/0259379 A1 * | 10/2009 | Hurwitz et al. | 701/100 |
| 2010/0139243 A1 * | 6/2010 | Migliaro, Jr. | 60/226.3 |

FOREIGN PATENT DOCUMENTS

| | | | |
|---|---|---|---|
| EP | 0315524 | | 11/1991 |
| EP | 0836000 | | 4/1998 |
| EP | 1310658 | | 5/2003 |
| FR | 2146109 | | 3/1973 |
| FR | 2887854 | | 1/2007 |
| GB | 2187796 A | * | 9/1987 |
| GB | 2203494 | | 10/1988 |
| JP | 10-196456 | | 7/1998 |

* cited by examiner

VARIABLE AREA FAN NOZZLE AND THRUST REVERSER

This application is a continuation of U.S. application Ser. No. 11/693,096 filed on Mar. 29, 2007 now U.S. Pat. No. 8,127,529.

BACKGROUND OF THE INVENTION

This invention relates to gas turbine engines and, more particularly, to a gas turbine engine having a variable fan nozzle integrated with a thrust reverser of the gas turbine engine.

Gas turbine engines are widely known and used for power generation and vehicle (e.g., aircraft) propulsion. A typical gas turbine engine includes a compression section, a combustion section, and a turbine section that utilize a primary airflow into the engine to generate power or propel the vehicle. The gas turbine engine is typically mounted within a housing, such as a nacelle. A bypass airflow flows through a passage between the housing and the engine and exits from the engine at an outlet.

Presently, conventional thrust reversers are used to generate a reverse thrust force to slow forward movement of a vehicle, such as an aircraft. One type of conventional thrust reverser utilizes a moveable door stowed near the rear of the nacelle. After touch-down of the aircraft for landing, the door moves into the bypass airflow passage to deflect the bypass airflow radially outwards into cascades, or vents, that direct the discharge airflow in a forward direction to slow the aircraft. Although effective, this and other conventional thrust reversers serve only for thrust reversal and, when in the stowed position for non-landing conditions, do not provide additional functionality. The limited functionality and the weight that a conventional thrust reverser adds to the engine contribute to engine inefficiency. Therefore, in order to improve engine efficiency, there is a need for a system having a thrust reverser that is integrated with at least one other engine system for additional functionality outside of landing.

SUMMARY OF THE INVENTION

An example nozzle for use in a gas turbine engine includes a nozzle door having a first end, a second end opposed from the first end, and a first pivot on the door between the first end and the second end. A linkage connects to the nozzle door and to an actuator. The actuator is selectively operative to move the linkage about a second pivot to in turn move the nozzle door about the first pivot between a plurality of positions, such as a stowed position, an intermediate position, and a thrust reverse position, to influence a bypass airflow through a fan bypass passage. The fan bypass passage has a radially outward side defined by a nacelle in at least one position. At least a portion of the nozzle door is radially outward of the nacelle and the nozzle door includes a lip that extends from the nozzle door between the first pivot and one of the first end and the second end.

Another example nozzle includes a nozzle door having a first end, a second end opposed from the first end, and a first pivot on the door between the first end and the second end. A linkage connects to the nozzle door and to an actuator. The actuator is selectively operative to move the linkage about a second pivot to in turn move the nozzle door about the first pivot between a plurality of positions, such as a stowed position, an intermediate position, and a thrust reverse position, to influence a bypass airflow through a fan bypass passage. The linkage and the nozzle door rotate in the same direction and the nozzle door includes a lip that extends from the nozzle door between the first pivot and one of the first end and the second end.

In one example, the stowed position corresponds to an aircraft take-off condition, the intermediate position corresponds to an aircraft cruise condition, and the thrust reverse position corresponds to an aircraft condition after landing.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
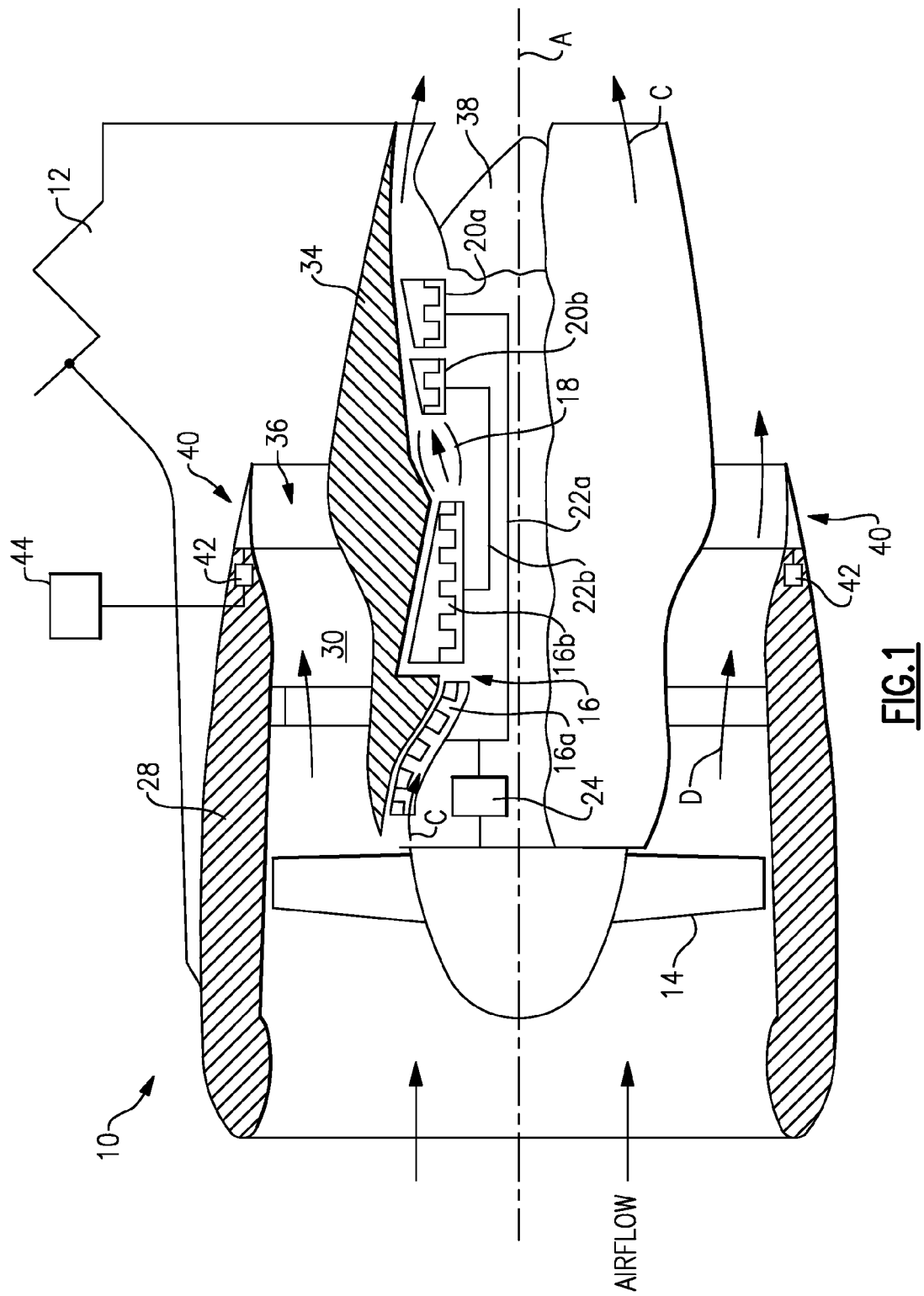
FIG. 1 illustrates selected portions of an example gas turbine engine system having a nozzle that integrates functions of a variable fan nozzle and a thrust reverser.

FIG. 1 illustrates a schematic view of selected portions of an example gas turbine engine 10 suspended from an engine pylon 12 of an aircraft, as is typical of an aircraft designed for subsonic operation. The gas turbine engine 10 is circumferentially disposed about an engine centerline, or axial centerline axis A. The gas turbine engine 10 includes a fan 14, a low pressure compressor 16a, a high pressure compressor 16b, a combustion section 18, a high pressure turbine 20b, and a low pressure turbine 20a. As is well known in the art, air compressed in the compressors 16a, 16b is mixed with fuel that is burned in the combustion section 18 and expanded in the turbines 20a and 20b. The turbines 20a and 20b are coupled for rotation with, respectively, rotors 22a and 22b (e.g., spools) to rotationally drive the compressors 16a, 16b and the fan 14 in response to the expansion. In this example, the rotor 22a also drives the fan 14 through a gear train 24.

In the example shown, the gas turbine engine 10 is a high bypass geared turbofan arrangement. In one example, the bypass ratio is greater than 10:1, and the fan 14 diameter is substantially larger than the diameter of the low pressure compressor 16a. The low pressure turbine 20a has a pressure ratio that is greater than 5:1, in one example. The gear train 24 can be any known suitable gear system, such as a planetary gear system with orbiting planet gears, planetary system with non-orbiting planet gears, or other type of gear system. In the disclosed example, the gear train 24 has a constant gear ratio. Given this description, one of ordinary skill in the art will recognize that the above parameters are only exemplary and that other parameters may be used to meet the particular needs of an implementation.

An outer housing, nacelle 28, (also commonly referred to as a fan nacelle) extends circumferentially about the fan 14. A generally annular fan bypass passage 30 extends between the nacelle 28 and an inner housing, inner cowl 34, which generally surrounds the compressors 16a, 16b and turbines 20a, 20b.

In operation, the fan 14 draws air into the gas turbine engine 10 as a core flow, C, and into the bypass passage 30 as a bypass air flow, D. In one example, approximately 80 percent of the airflow entering the nacelle 28 becomes bypass airflow D. A rear exhaust 36 discharges the bypass air flow D from the gas turbine engine 10. The core flow C is discharged from a passage between the inner cowl 34 and a tail cone 38. A significant amount of thrust may be provided by the bypass airflow D due to the high bypass ratio.

The example gas turbine engine 10 shown FIG. 1 also includes a nozzle 40 (shown schematically) associated with the bypass passage 30. In this example, the nozzle 40 is coupled with the trailing edge of the nacelle 28.

The nozzle 40 includes actuators 42 for movement between a plurality of positions to influence the bypass air flow D, such as to manipulate an air pressure of the bypass air flow D. A controller 44 commands the actuators 42 to selectively move the nozzle 40 among the plurality of positions to manipulate the bypass air flow D in a desired manner. The controller 44 may be dedicated to controlling the actuators 42 and nozzle 40, integrated into an existing engine controller within the gas turbine engine 10, or be incorporated with other known aircraft or engine controls. For example, selective movement of the nozzle 40 permits the controller 44 to vary the area of the nozzle 40 for various conditions, enhance conditions for aircraft control, enhance conditions for operation of the fan 14, or enhance conditions for operation of other components associated with the bypass passage 30, depending on input parameters into the controller 44.

In one example, the gas turbine engine 10 is designed to operate within a desired performance envelope under certain predetermined conditions, such as cruise. For example, it is desirable to operate the fan 14 under a desired pressure ratio range (i.e., the ratio of air pressure forward of the fan 14 to air pressure aft of the fan 14) to avoid fan flutter. To maintain this range, the nozzle 40 influences the bypass airflow D to control the air pressure aft of the fan 14 and thereby control the pressure ratio. For example, for a cruise condition, the nozzle 40 permits less bypass airflow D, and in a take-off condition the nozzle permits more bypass airflow D. In some examples, the nozzle varies a cross-sectional area associated with the bypass passage 30 by approximately 20% to increase the bypass airflow D for take-off. Thus, the nozzle 40 enables the performance envelope to be maintained over a variety of different flight conditions.

Figure 2:
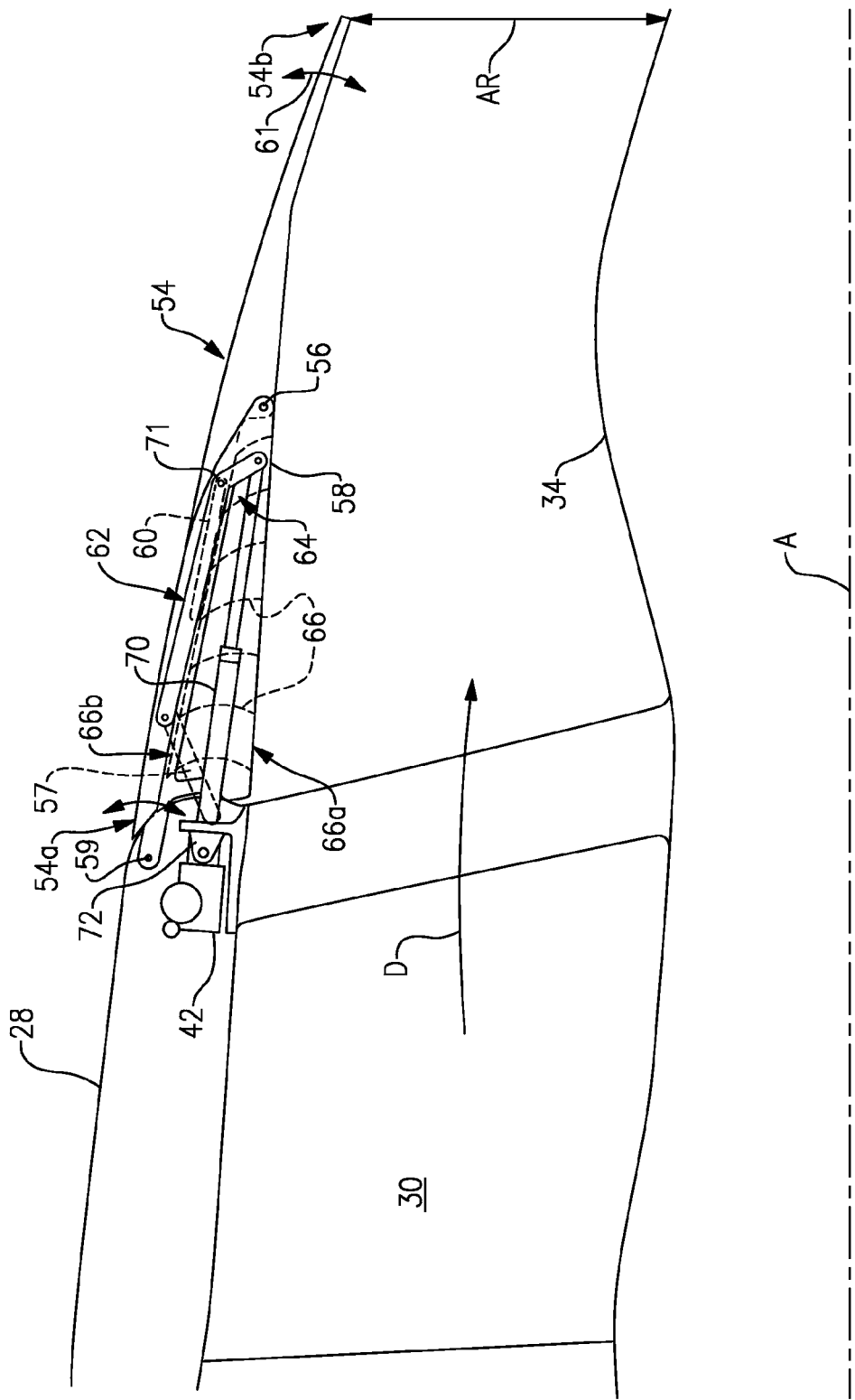
FIG. 2 is a schematic view of an example nozzle door in a stowed position.
Figure 3:
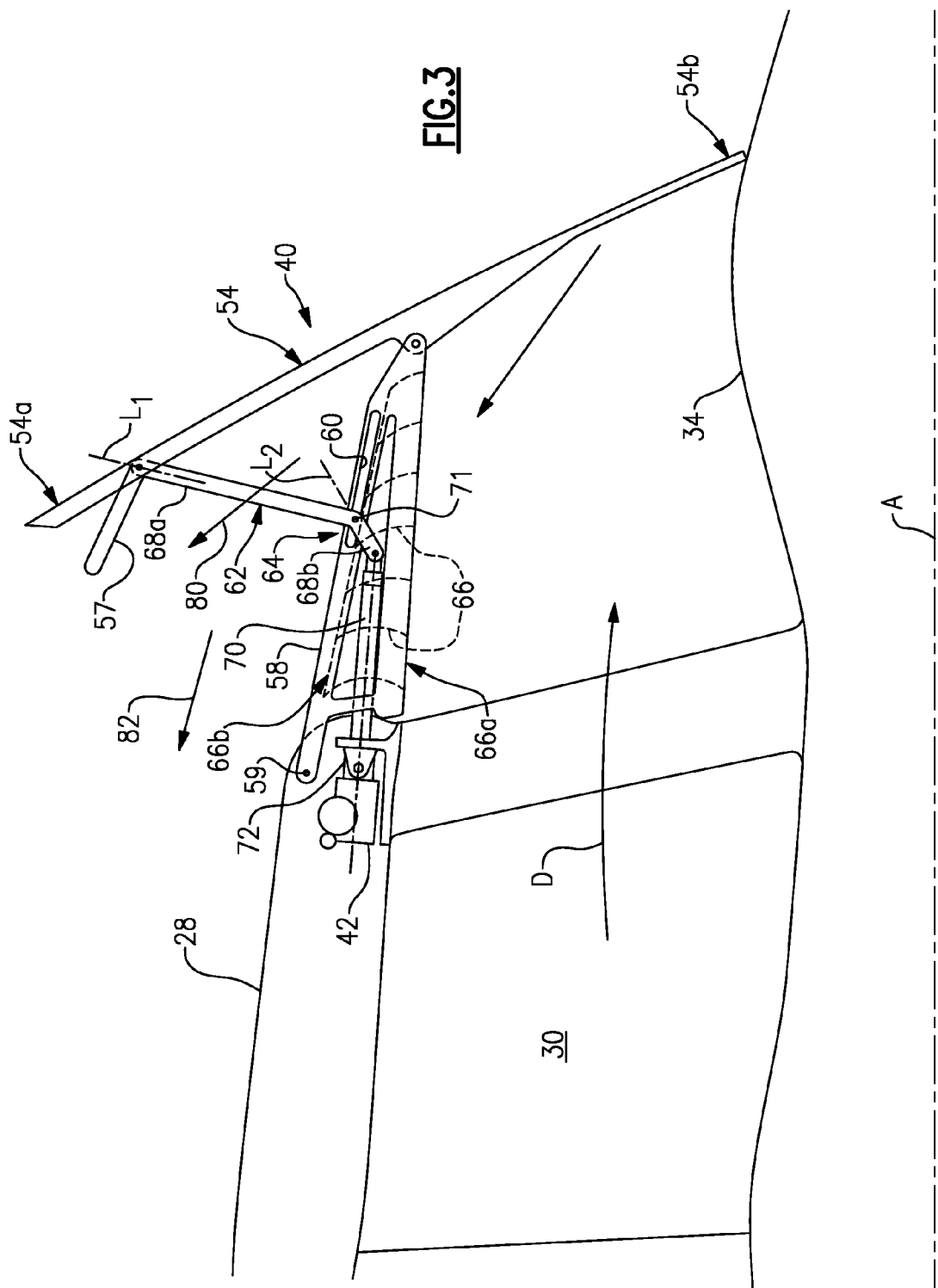
FIG. 3 is a schematic view of the example nozzle door in a thrust reverse position.

FIGS. 2 and 3 illustrate selected positions of an example nozzle 40. In FIG. 2, the nozzle 40 is in a cruise position, but may be moved to a take-off position or thrust reverse position. In FIG. 3, the nozzle is in the thrust reverse position to slow forward movement of an aircraft.

In the disclosed examples, the nozzle 40 includes a plurality of nozzle doors 54 (one shown) located circumferentially about the trailing end of the nacelle 28. Each of the nozzle doors 54 includes a first end 54a, a second end 54b opposed from the first end, and a pivot 56 located between the ends 54a and 54b. The nozzle door 54 is rotatable about the pivot 56 between the cruise position and the thrust reverse position. The nozzle 40 is also pivotable about a hinge point 59 to move the end 54b of the nozzle 40 along direction 61 between the cruise position and a take-off position, as will be described below.

A lip 57 extends from the nozzle door 54 between the pivot 56 and the first end 54a. The lip 57 may be integrally formed with the nozzle door 54, or a separate piece that is attached to the nozzle door 54 in a known manner.

A frame 58 is pivotally secured to the trailing end of the nacelle 28 at hinge point 59 and supports the nozzle door 54 at the pivot 56. The frame 58 includes multiple slots 60 (one shown) that slidingly receive a first link 62 of a linkage 64 that connects the nozzle door 54 with the actuator 42. The first link 62 includes an end section 68a that is secured to the nozzle door 54 and another end section 68b that is secured with a an actuator rod 70. In this example, the end section 68a extends in a lengthwise direction along axis $L_1$ (FIG. 3) and the end section 68b extends in a lengthwise direction along axis $L_2$, which is transverse to $L_1$. The actuator rod 70 is pivotally connected at one end with the end section 68b of the first link 62 and at the other end with a trunnion pivot 72 to the actuator 42. In one example, the trunnion pivot 72 is shimmed to allow adjustment of the linkage 64, such as adjustment for wear after a period of usage or adjustment for fine tuning the movement of the nozzle door 54.

The frame 58 also includes openings 66, or vents, that each open on one end 66a to the bypass passage 30 and on another end 66b to the outer surroundings of the engine 10. When the nozzle door 54 is in the cruise position, the nozzle door 54 abuts the ends 66b such that the openings 66 become blind and are open only on the end 66a facing the bypass passage 30. Each of the openings 66 includes a corresponding length extending between the end 66a and the nozzle door 54. In one example, one or more of the openings 66 are designed with lengths that correspond to an acoustic characteristic of the bypass airflow D through the bypass passage 30. The acoustic characteristic, such as an acoustic frequency or acoustic amplitude, can be determined or estimated in a known manner using experimental measurements, computer simulation, or other known technique. For example, the lengths are designed such that acoustic energy carried by the bypass airflow D reflects within the openings 66 and thereby acoustically cancels to provide a benefit of sound attenuation.

The controller 44 commands the actuator 42 to move the nozzle 40 between the take-off position, cruise position, and thrust reverse position, depending on aircraft conditions. The aircraft conditions may be determined using known parameters, such as rotor 22a or 22b speed, aircraft speed, sensing a weight on an aircraft landing gear, etc.

In one example, the controller 44 moves the nozzle 40 between the take-off condition and the cruise condition nozzle 40 to change a cross-sectional area, AR (FIG. 2), which corresponds to the cross-sectional area of the annular bypass passage 30 adjacent the nozzle 40. The controller 44 selectively commands the actuator 42 to move the nozzle 40 and thereby change the cross-sectional area AR to influence the bypass airflow D in a desired manner, depending on the aircraft conditions (e.g., take-off, landing, and cruise). That is, the controller 44 moves the nozzle 40 to a cross-sectional area AR that is desired for the aircraft condition.

For example, moving the nozzle to a relatively smaller overall cross-sectional area for aircraft cruise (FIG. 2) would restrict the bypass airflow D and produce a pressure build-up (i.e., an increase in air pressure) within the bypass passage 30. Moving the nozzle 40 to a relatively larger cross-sectional area for take-off (i.e., pivoting the nozzle 40 about hinge point 59 such that the end 54b moves outwards from centerline axis A) permits more bypass airflow D and reduces the pressure build-up (i.e., a decrease in air pressure). Thus, depending on the input parameters into the controller 44, the controller 44 commands the actuator 42 to move the nozzle doors 54 to a desired position to control the bypass airflow D in a desired manner.

To move the nozzle 40 between the take-off position and the cruise position, the actuator 42 moves the actuator rod 70 (i.e., either to the left or to the right in Figures), which in turn moves the first link 62 along the slot 60. When the first link 62 encounters the end of the slot 60, the nozzle 40 will be forced to pivot about hinge point 59, thereby changing the cross-sectional area AR. As can be appreciated, the amount that the nozzle 40 pivots depends on the amount that the actuator 42 moves the actuator rod 70.

To move the nozzle door 54 to the thrust reverse position, the actuator 42 retracts the actuator rod 70 (i.e., to the left in figures). Movement of the actuator rod 70 causes the first link 62 to pivot (clockwise in FIG. 3) about the pivot connection 71 within the slot 60 such that the first link 62 pivots the nozzle door 54 about pivot 56 (clockwise in FIG. 3) to the intermediate or thrust reverse position. Likewise, the actuator 42 extends the actuator rod 70 to pivot the nozzle door 54 in the opposite direction.

In the thrust reverse position, the nozzle door 54 extends radially outwards from the nacelle 28 and radially inwards from the nacelle 28 into the bypass passage 30. In the illustrated example, the nozzle door 54 is pivoted until the second end 54b of the nozzle door 54 abuts the inner cowl 34. Movement of the nozzle door 54 to the thrust reverse position opens an auxiliary passage 80 for discharge of the bypass airflow D in a forward direction 82 (relative to movement of the engine 10). The second end 54b of the nozzle door 54 deflects the bypass airflow D radially outwards through the openings 66. In one example, the openings 66 are angled or curved forward to turn the airflow forward. The lip 57 additionally deflects the airflow forward to slow forward movement of the aircraft.

The disclosed example nozzles 40 thereby integrates the functions of varying the cross-sectional area of the bypass passage 30 to influence the bypass airflow D in a desired manner and thrust reversal for slowing forward movement of an aircraft. Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gas turbine engine comprising:
a core engine defined about an axis;
a nacelle arranged about the core engine;
a gear system driven by said core engine;
a turbofan driven by said gear system about said axis to generate a bypass flow in a fan bypass passage; and
a variable area flow system which operates to effect said bypass flow, wherein said bypass flow generates a bypass ratio greater than ten (10), said variable area flow system including a nozzle door associated with the fan bypass passage that moves between a stowed position, an intermediate position, and a thrust reverse position to influence the bypass flow and a frame member supporting the nozzle door, wherein the frame is pivotally secured to an aftmost end of the nacelle relative to the bypass flow.

2. The gas turbine engine of claim 1, wherein the gear system has a constant gear ratio.

3. The gas turbine engine of claim 1, wherein the gear system is a planetary gear train.

4. The gas turbine engine of claim 1, wherein said core engine includes a low pressure compressor and a low pressure turbine, the low pressure turbine defines a pressure ratio that is greater than five (5).

5. The gas turbine engine of claim 1, wherein said variable area flow system operates to change a pressure ratio of the bypass flow.

6. The gas turbine engine of claim 1, wherein said variable area flow system operates to vary an area of a fan nozzle exit area for said bypass flow.

7. The gas turbine engine of claim 1, wherein a linkage is connected with the nozzle door, wherein an actuator is coupled with the linkage, wherein the actuator is selectively operative to pivotably move the linkage to in turn pivotably move the nozzle door between a plurality of positions to influence the bypass flow.

8. The gas turbine engine of claim 1, wherein the frame member includes openings there through, each opening having a first end open to the bypass passage and a second end open to a surrounding environment when the nozzle door is in the thrust reverse position.

9. The gas turbine engine of claim 1, wherein the frame includes at least one slot.

10. The gas turbine engine of claim 9, wherein the at least one slot receives a portion of the linkage.

* * * * *